United States Patent [19]
Wilson

[11] 4,063,429
[45] Dec. 20, 1977

[54] PIPELINE RETARD, SUPPORT AND PROTECTION METHOD

[76] Inventor: Ernest I. Wilson, 192 S. 1st West, Nephi, Utah 84648

[21] Appl. No.: 595,973

[22] Filed: July 14, 1975

Related U.S. Application Data

[63] Continuation-in-part of Ser. No. 413,747, Nov. 7, 1973, abandoned.

[51] Int. Cl.² .................. B29D 27/04; E02D 31/06; F16L 58/101; F16L 59/00
[52] U.S. Cl. ........................................ 61/105; 61/106; 264/32; 264/46.4; 264/46.7; 264/46.9
[58] Field of Search ............... 264/32, 35, 46.9, 46.4, 264/46.7; 61/41 R, 72.1, 72.2, 72.4, 105, 106, 50

[56] References Cited
U.S. PATENT DOCUMENTS

| | | | |
|---|---|---|---|
| 685,522 | 10/1901 | Muirhead | 61/41 R |
| 922,106 | 5/1909 | Ducastel | 61/50 |
| 1,588,897 | 6/1926 | Marston | 61/106 X |
| 1,671,679 | 5/1928 | Marston | 61/72.1 |
| 2,447,937 | 8/1948 | Ellis et al. | 61/72.2 |
| 2,738,745 | 3/1956 | Harpold | 61/72.1 |
| 2,987,891 | 6/1961 | Phillips | 61/105 |
| 3,032,827 | 5/1962 | Schaffer | 264/35 |
| 3,131,541 | 5/1964 | Guthrie | 61/72.1 X |
| 3,349,568 | 10/1967 | Smith et al. | 61/72.2 |
| 3,354,660 | 11/1967 | Vaughan | 61/72.2 |
| 3,380,258 | 4/1968 | Young | 61/72.2 |
| 3,432,582 | 3/1969 | Bender | 264/46.9 |
| 3,444,279 | 5/1969 | Dost | 264/46.9 X |
| 3,462,962 | 8/1969 | Jessen | 61/106 |
| 3,564,859 | 2/1971 | Goodman | 61/53.5 |
| 3,626,702 | 12/1971 | Monahan | 61/50 |
| 3,655,564 | 4/1972 | Barrington | 61/72.1 |
| 3,722,225 | 3/1973 | Empson | 61/106 |

FOREIGN PATENT DOCUMENTS

| | | | |
|---|---|---|---|
| 780,179 | 3/1968 | Canada | 264/32 |
| 17,227 of | 1902 | United Kingdom | 61/50 |
| 1,360,964 | 7/1974 | United Kingdom | 61/72.4 |

Primary Examiner—Philip Anderson
Attorney, Agent, or Firm—H. Ross Workman; J. Winslow Young

[57] ABSTRACT

A pipeline retard, support and protection method wherein a fast-setting expandable foam is placed in a trench at spaced locations below and around a pipeline to create spaced retards and support pads in situ. Each retard and/or support pad is created in the absence of forms or other foam molding means for the expanding foam. The retards may be keyed to the trench walls and base for securement. The system is also adaptable to encapsulating a portion of the pipeline which transverses a roadbed.

4 Claims, 4 Drawing Figures

PIPELINE RETARD, SUPPORT AND PROTECTION METHOD

BACKGROUND

1. Related Application

This application is a continuation-in-part of copending application Ser. No. 413,747 filed Nov. 7, 1973 now abandoned.

2. Field of the Invention

This invention relates to an improved pipeline retard, support and protection method and more particularly to an improved method for securing a pipeline in a trench.

3. The Prior Art

It is historically well-known in the art of laying pipelines that any metallic pipe which is placed in the ground is subject to corrosion. Corrosion of a pipeline weakens the wall thereof and subsequently permits leakage. Discovery of gas leaks caused by pipe rupture is troublesome and expensive because the pipelines often extend for several hundred miles over rough terrain.

To reduce corrosion, pipelines are generally treated by coating and wrapping to protect the pipeline from the corrosive environment of a trench. However, particularly in long natural gas pipelines, the pipeline expands and contracts in response to changes in internal pressure. Accordingly, a pipeline coating is often abraded and destroyed by rocks in the trench.

Where sandbags are used as retards to support the pipeline in the trench and prevent water percolation, water promotes rot of the bag material until the fabric disintegrates. Water thereafter erodes the sandbag contents. This problem is extremely aggravated when the pipeline trench is inclined. With the sandbag retards and supports eroded, the pipeline is allowed to contact the trench walls. The pipeline coating becomes abraded and exposes the pipeline to corrosion.

The use of foam materials for thermal insulation purposes is well-known (see, for example, U.S. Pat. Nos. 3,722,225 and 3,380,258). However, this insulation extends the entire length of the pipeline and is subject to the abrading and destruction described above.

The use of foam for stabilizing a foundation is also known (see, for example, U.S. Pat. No. 3,626,702). However, this foam extends the entire length of the structure and completely fills the cavity beneath the stabilized structure. Until this present invention, no method has been provided which accommodates facile application of foam pipeline supports which are formed in situ from an expanding and fast-setting foam and have the unique characteristic of at least partially supporting a pipeline while simultaneously preventing water channeling longitudinally along the trench.

BRIEF SUMMARY AND OBJECTS OF THE INVENTION

The present invention advantageously provides a unique pipeline retard method in which a pipeline is protected from destructive contact with the walls and/or bottom of a trench. The retards also significantly inhibit the longitudinal channeling of water along the pipeline.

Accordingly, it is a primary object of the present invention to provide a novel pipeline protection method.

It is another object of the present invention to provide an improved method of forming a pipeline retard in situ from expandable foam.

Another valuable object is to provide a method for preventing water percolation along a pipeline.

These and other objects and features of the invention will be more fully understood from the following description and appended claims taken in conjunction with the accompanying drawings.

DETAILED DESCRIPTION OF THE PREFERRED EMBODIMENT

General

Conventionally, a pipeline is assembled alongside a previously prepared trench and is then coated and wrapped immediately prior to being lowered into the trench on a bed of earth or sandbag supports. Sandbag supports are spaced in the trench according to the load bearing requirements and terrain over which the pipeline passes.

The Improved Structure

Reference is now made to the drawings wherein like parts are designated with like numerals throughout.

Any type pipeline system may advantageously benefit from this invention. However, for ease of presentation, the discussion will be directed toward a natural gas pipeline. In this specification, "retard" is defined to mean a pipeline-engaging, substantially solid barrier which retards the percolation of water along at least a portion of the exterior periphery of the pipeline.

Figure 1:
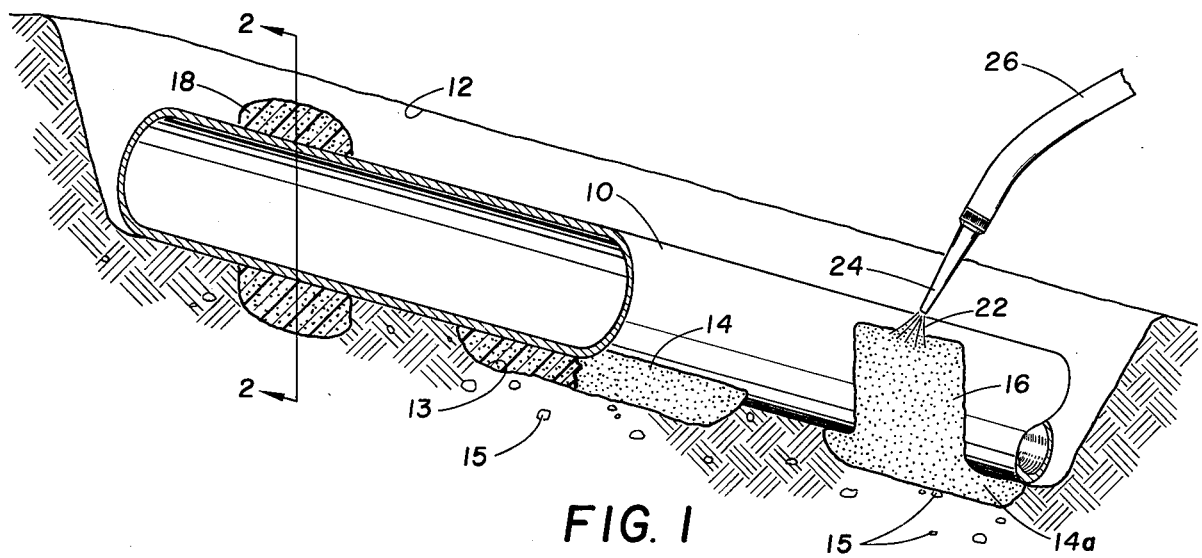
FIG. 1 is a schematic view of a section of pipeline in an inclined trench with one wall of the trench broken away, the pipeline being partially cut away and illustrated as supported and protected by retards and support pads according to a preferred embodiment of the invention.

Referring to FIG. 1, a section of a pipeline 10 is shown in a trench 12 and is initially supported by a plurality of spaced foam support pads 14, only one of which is shown as an independent unit. The support pad 14 is formed in situ by spraying a fast-setting foam reaction mixture into the trench and thereafter placing a pipeline 10 thereon for support. Alternatively, an existing pipeline 10 may be supported on a foam pad 14 which is injected into an excavation 13 beneath the pipeline 10 and permitted to set. The support pads are retards to the extent that they both support the pipeline 10 and prevent water from channeling beneath the pipeline. Support pads 14 are generally created in areas of rocks 15 and the like to prevent damage to the pipeline by shielding the pipeline from the rocks. Support over rocky terrain is also achieved through the use of retards 16 and 18. However, where additional support may be required, a support pad 14a may be created as an integral part of a retard, for example, retard 16.

The retard 16 is illustrated in the process of in situ formation. Retard 16 is spaced from retard 18, the magnitude of the space being determined by soil conditions and pipeline angle. In general, it is desirable that the retards 16 and 18 have thickness along the axis of the pipeline 10 which is great enough to support the corresponding segment of pipeline. The fact that the thickness of the retards 16 and 18 is only a small increment of the total pipeline length contributes significantly to economical use of the retards. It is presently believed that the distance between retards 16 and 18 should be greater than the thickness of either retard to facilitate economical in situ retard formation even where the pipeline 10 traverses a comparatively steep angle.

The illustrated retards 16 and 18 conform to and substantially circumscribe the pipeline 10. It is also highly advantageous that the retards 16 and 18 conform to the bottom and walls of the trench 12. Thus, essentially the entire trench 12 is secured against water percolation and erosion in the vicinity of the pipeline will be minimized.

Retard 16 is illustrated being formed by the accretion of foam from a stream of fast-setting foam reaction mixture 22 injected into the trench from a conventional mixing nozzle 24. The foam may be of any suitable type, for example a two component foam including isocyanate and a polyol mixture used with a catalyst and Freon. This isocyanate foam is characterized in part by noticeable expansion immediately prior to setting. The expandability of the foam is highly desirable because it facilitates close, essentially uniform conformance with the configuration of the trench 12. This expandable and fast-setting foam is commercially available from Utah Foam Products, Salt Lake City, Utah, under the designation 120-3S. The identified expandable foam results from the chemical reaction of the two components when mixed in a suitable nozzle 24. The expanded product may have a volume as much as 20 to 30 times the original volume of the component.

The foam is preferably sprayed under pressures of about 800–1100 psi from a two component, self-cleaning nozzle or gun with a capacity of 15 pounds per minute. A suitable nozzle is also available from Utah Foam Products. Greatest success is found when the foam is sprayed in ambient temperatures not less than 40° F (4.4° C).

Foam components are supplied to nozzle 24 by hose 26 from sources of material (not shown). The foam components are then directed into the desired location in the trench by an operator (not shown). This invention in one presently preferred embodiment is characterized by the absence of forms or other shaping structures since a fast-setting expandable foam is preferably used in situ to create the retards and support pads.

Figure 2:
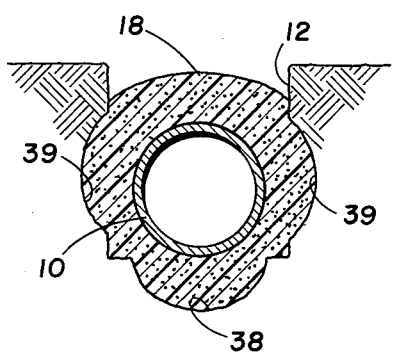
FIG. 2 is a cross-sectional view taken along lines 2—2 of FIG. 1.

Referring to FIG. 2, an undercut portion or notch in at least one wall of trench 12 serves as a retard locking mechanism or recess as shown at 38 and 39. When recesses 38 and 39 are filled with the expanding foam, the foam hardens into retard 18 which interlocks with the trench wall to securely hold the position of retard 18 in trench 12 against movement due to water percolation. Alternatively, the retard locking may be in the form of a vertically extending slot or keyway traversing the entire height of the trench 12. The purpose for the locking mechanism is to prevent the longitudinal movement of the retard in the trench with subsequent loss of sealing and support effectiveness.

Locking the retards to the trench wall has been found most desirable where the trench is inclined and locking may be deleted on level terrain. In both cases, the retards resist disintegration and displacement by water percolation and the like.

As shown, the retard 18 preferably circumscribes most, if not all, of the circumference of a longitudinal section of the pipeline. In some circumstances, it has been found beneficial for the retard to extend a significant distance above the top of the pipeline.

Figure 3:
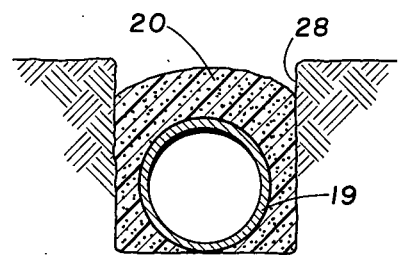
FIG. 3 is a cross-sectional view of a typical retard configuration usable in trenches formed in essentially level terrain.

Referring to FIG. 3, a trench 28 is illustrated in a cross-sectional view cut through a retard 20 about a pipeline 19. As shown, retard 20 is not keyed into trench 28. This type of unkeyed retard is most commonly employed in trench 28 excavated in substantially level terrain. Generally, retards are sparsely used in pipeline trenches in level ground. However, trenches through swampy areas may require the use of an increased number of retards per unit length of pipeline, depending upon conditions encountered.

Figure 4:
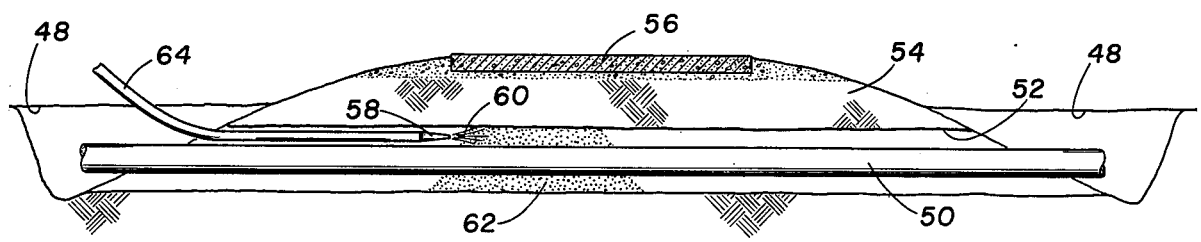
FIG. 4 is a schematic view, shown partly in cross-section, of a roadbed with pipeline secured therein according to a presently preferred method embodiment of the invention.

Referring to FIG. 4, a section of pipeline 50 is shown in a bore or tunnel 52 excavated laterally underneath a roadbed 54 which supports a road or highway 56. The tunnel can be an existing conduit capable of receiving the pipeline or bored by conventional tunnel boring methods generally from a transversely extending trench 48. With the pipeline 50 in place in tunnel 52, a foam injection nozzle 58 injects a stream of expandable foam 60 into the annular space between pipeline 50 and tunnel 52. The foam then encapsulates pipeline 50. Nozzle 58 is supported on the end of a material supply line 64 and is of sufficient length to extend at least one-half the length of tunnel 52. In this manner, nozzle 58 can be inserted at least half-way from each end of bore 52 to inject foam therein. Removal of nozzle 58 as foam is injected permits the entire annular space to be filled with foam.

The Improved Method

Use of a fast-setting, expandable foam such as previously described permits facile placement of retards and/or support pads in a pipeline trench. Importantly, a fast-setting, expandable foam obviates the use of forms or other shape-retaining devices and has been found surprisingly effective in solving the well-known problem of water percolation along the pipeline.

In practice, after the trench 12 has been excavated and before the pipeline 10 is laid therein, a plurality of support pads 14 are created in the base of the trench 12, where necessary, to protect the pipeline from rocks and the like. Future locations for placement of foam retards are also predetermined. After the pipeline 10 has been laid in the trench, foam is injected into the trench at the previously designated locations. Where expandable foam is used, the foam expands and sets to create the upstanding retards 16 and 18. Support pad 14a may also be created integrally with retard 16 after the pipeline is in place.

The size of the retard and/or support pad and the amount of foam required depends upon the size of the pipeline to be supported and the size of the trench. By way of example, an 18-inch pipeline in a correspondingly sized trench may be provided with a retard about 18 inches thick as measured along the axis of pipeline 10. A retard of this size would require approximately 50 pounds of foam. Preferably the top of the retard is terminated below the upper edge of the trench as shown in FIG. 1.

Creation of the retard is easily accomplished by insertion of a foaming nozzle into the trench and injecting foam therein until the desired quantity of foam has been injected into the space surrounding the pipeline. Normally the backfilling of the trench with earth is delayed for from 1 to 12 hours to assure complete cure of the foam.

The retards of this invention substantially fill the void underneath and around a discrete length of pipeline 10 to effectively obstruct the longitudinal percolation of water in the trench. Foam expansion and fast-setting enhances the complete filling of the spaces and interstices of trench wall along the thickness of the retard. The retard thereby more effectively seals the trench since the walls and base of a trench are usually very irregular. It may also be desirable to notch the trench walls and/or bottom prior to placement of the foam into the trench so that the resulting retard 18 is keyed to the trench.

Currently, when a pipeline is placed in a bore underneath a highway, according to the teachings of the present invention, the use of a casing, spacer blocks, seals, vent pipes, etc., is eliminated by the use of a suitably prepared pipeline which is placed into the bore and the annular space therebetween injected with expandable foam.

Generally, a suitably prepared pipeline comprises a section of pipeline having a greater wall thickness and which is suitably wrapped with a protective layer prior to being encased in a wire mesh and concrete jacket. For example, in one embodiment of this invention, a section of 36 inch O.D. pipeline is suitably coated and then jacketed with a 1 inch thick concrete and wire mesh jacket. The pipeline section is then inserted into a 42 inch I.D. bore and the annular space resulting therein is filled with an injected foam. Once installed, conventional cathodic protection systems are installed on the pipeline.

The foregoing system offers the following advantages: (1) the increased thickness of the section of pipe over normal pipe results in lower stresses and high strength; (2) with this type of crossing there is no problem of shorting out the cathodic protection system between the pipeline and a metallic casing; (3) the concrete jacket protects the pipe coating during installation in the bore; (4) there are no insulating spaces that could possibly dent the pipeline or tear the protective wrapping; (5) with the elimination of the annular space between the pipeline and a casing moisture cannot collect around the pipeline; (6) the vent pipes are eliminated; (7) the cost for each crossing is substantially reduced; and (8) the cost for future maintenance of the pipeline is significantly reduced.

The invention may be embodied in other specific forms without departing from its spirit or essential characteristics. The described embodiment is to be considered in all respects only as illustrative and not restrictive and the scope of the invention is, therefore, indicated by the appended claims rather than by the foregoing description. All changes which come within the meaning and range of equivalency of the claims are to be embraced within their scope.

What is claimed and desired to be secured by United States Letters Patent is:

1. A method of inhibiting soil erosion along a pipeline in a trench, the steps of:
    selecting a pipeline segment which is characterized by a space between each side of the pipeline and the banks of the trench;
    directing the nozzle of a spray apparatus toward one of the spaces and delivering a foam reaction mixture through the spray nozzle to the bottom of the trench immediately adjacent one side of the pipeline segment and filling at least a portion of the space along the selected pipeline segment by creating an accretion of foam between one side of the pipeline segment and one bank of the trench;
    removing the spray nozzle to the other side of the pipeline segment essentially diametrically opposite the one side and repeating the directing and delivering steps and filling at least a portion of the space along the pipeline segment by creating an accretion of foam between the other side of the pipeline segment and the other bank of the trench, the accretion of foam on both sides of the pipeline segment forming a retard; and
    backfilling the trench around the accretion of foam forming the retard.

2. A method as defined in claim 1 further comprising excavating a notch in at least one surface of the trench adjacent the selected pipeline segment and directing the spray nozzle into the excavated notch at the same time that foam is delivered between the pipeline segment and the one bank of the trench thereby forming by the accretion of foam a unitary retard which is interlocked into the trench wall.

3. A method as defined in claim 1 wherein said terminating step is preceded by the step of spraying foam reaction mixture over the top of the pipeline segment between the filled spaces on the diametrally opposed sides of the pipeline thereby encapsulating the pipeline only at the location of the selected segment.

4. A method of inhibiting soil erosion along a pipeline situated in a trench, the steps of:
    selecting a segment of pipeline upon which a retard is to be formed, said segment having its sides spaced from both banks of the trench;
    suspending the pipeline segment such that a space exists between the bottom of the trench and the pipeline segment;
    inserting a spray nozzle into the trench and directing the spray nozzle toward the space between the trench bottom and the underside of the pipeline segment;
    spraying a foam reaction mixture into the space and substantially filling at least a portion of the space thereby forming a support pad;
    removing the spray nozzle to the space between one side of the pipeline segment and the trench bank and delivering foam reaction mixture into the space between the pipeline segment and the trench bank so as to be contiguous with the support pad, creating thereby an accretion of foam united with the support pad and filling at least a portion of the space only along the one side of the selected segment of pipeline;
    repeating the removing and delivering steps in the space between the other side of the pipeline segment and the trench bank contiguous with the support pad, creating thereby an accretion of foam united with the support pad and filling at least a portion of the space only along the other side of the selected pipeline segment; and
    terminating the accretion of foam before the foam reaches the upper edge of the trench banks thereby forming a retard in situ which is united with the support pad, substantially fills the spaces between the trench banks and the sides of the pipeline only along the pipeline segment and is recessed into the trench below the upper edge of the trench banks.

* * * * *